(12) United States Patent
Wenzel (10) Patent No.: US 11,213,981 B2
(45) Date of Patent: Jan. 4, 2022

(54) DEVICE AND METHOD FOR PRODUCING OBJECTS FROM A SOLIDIFYING MOULDING COMPOUND WITH A PUSHER DEVICE

(71) Applicant: LEONI KABEL GMBH, Nuremberg (DE)

(72) Inventor: Joerg Wenzel, Roth (DE)

(73) Assignee: Leoni Kabel GmbH

( * ) Notice: Subject to any disclaimer, the term of this patent is extended or adjusted under 35 U.S.C. 154(b) by 229 days.

(21) Appl. No.: 16/466,922

(22) PCT Filed: Sep. 27, 2017

(86) PCT No.: PCT/EP2017/074495
§ 371 (c)(1),
(2) Date: Jun. 5, 2019

(87) PCT Pub. No.: WO2018/103907
PCT Pub. Date: Jun. 14, 2018

(65) Prior Publication Data
US 2020/0061882 A1    Feb. 27, 2020

(30) Foreign Application Priority Data

Dec. 9, 2016  (DE) .................... 10 2016 224 581.3

(51) Int. Cl.
*B29C 45/00* (2006.01)
*B29C 45/04* (2006.01)
(Continued)

(52) U.S. Cl.
CPC ...... *B29C 45/0003* (2013.01); *B29C 45/0408* (2013.01); *B29C 45/28* (2013.01); *B29L 2031/3462* (2013.01)

(58) Field of Classification Search
CPC . B29C 45/28; B29C 45/0003; B29C 45/0408; B29C 45/38
See application file for complete search history.

(56) References Cited

U.S. PATENT DOCUMENTS 3,996,330 A * 12/1976 Jones ................... B29C 45/2626
264/328.9
5,204,127 A * 4/1993 Prusha ................ B29C 33/0033
425/256
(Continued)

FOREIGN PATENT DOCUMENTS

| AT | 504904 | 9/2008 |
|----|--------|--------|
| CN | 102092120 A | 6/2011 |

(Continued)

OTHER PUBLICATIONS

Gottfried Steiner et al: "Exjection: Dem Spritzgiessen . . . " Carl Hanser Verlang, München, Kunststoff, pp. 52-55, Apr. 2008.
(Continued)

*Primary Examiner* — Galen H Hauth
(74) *Attorney, Agent, or Firm* — Williams Mullen; Thomas F. Bergert (57) ABSTRACT

The invention relates to a device (10) for producing objects from a solidifying molding compound, comprising: a feed region (12) with at least one sprue point (32) for supplying the molding compound, and a mold insert (18), which at least in part bounds a cavity (36) in which the molding compound supplied through the sprue point (32) can be received, wherein the cavity (36) has at least one object molding region (38), which molds the object to be produced, and at least one distribution region (40), which is designed to guide the supplied molding compound to the object is molding region (38). The device further comprises at least one pusher device (44), which is designed in a first position to allow a connection of the object molding region (38) and
(Continued)

the distribution region (40), and in a second position to separate the object molding region (38) and the distribution region (40) from one another, wherein the mold insert (18) can be moved along a movement axis (B) relative to the feed region (12), and wherein the pusher device (44) can be actuated according to the relative movement.

14 Claims, 4 Drawing Sheets

(51) Int. Cl.
  *B29C 45/28* (2006.01)
  *B29L 31/34* (2006.01)

(56) References Cited

U.S. PATENT DOCUMENTS

| | | | |
|---|---|---|---|
| 2003/0137082 A1* | 7/2003 | Wohlrab | B29C 45/68 |
| | | | 264/328.1 |
| 2003/0215540 A1* | 11/2003 | Asai | B29C 45/73 |
| | | | 425/547 |
| 2008/0251963 A1 | 10/2008 | Steiner et al. | |
| 2015/0239161 A1 | 8/2015 | Antunes et al. | |

FOREIGN PATENT DOCUMENTS

| | | |
|---|---|---|
| CN | 103660195 A | 3/2014 |
| CN | 204109290 U | 1/2015 |
| CN | 105856507 A | 8/2016 |
| DE | 102012112491 | 6/2014 |
| DE | 102014226335 | 6/2016 |
| FR | 1176153 | 4/1959 |
| JP | H06226774 | 8/1994 |
| JP | H08336865 | 12/1996 |
| JP | 2002307155 A | 10/2002 |

OTHER PUBLICATIONS

Internationl Search Report and Written Opinnion of the International Searching Authority for PCT/EP2017-074495, European Patent Office, dated Dec. 9, 2016.

Examination Report, Intellectual Property Office of China, CN patent Application No. 201780075019.4, dated Oct. 21, 2020.

* cited by examiner

DEVICE AND METHOD FOR PRODUCING OBJECTS FROM A SOLIDIFYING MOULDING COMPOUND WITH A PUSHER DEVICE

CROSS-REFERENCE TO RELATED APPLICATIONS

This application is the U.S. national phase of international application PCT/EP2017/074495, filed on Sep. 27, 2017, which claims the benefit of German application 10 2016 224 581.3 filed on Dec. 9, 2016; all of which are hereby incorporated herein in their entirety by reference.

The disclosure relates to a device for producing objects from a solidifying molding compound, and to an associated method.

In the production of objects from a solidifying molding compound it is known that only specific solidified regions of the molding compound are to be used further as the actual object and end product. By contrast, the object initially often includes contours that are not permanently desired, for example in the form of burrs, solidified sprue channels or the like. These must be removed in separate post-processing steps, which means additional outlay in terms of work and often also the provision of devices intended solely for that purpose.

Accordingly, the object of the disclosure is to reduce the post-processing outlay of objects that are produced from a solidifying molding compound.

According to the present disclosure, a device for producing objects from a solidifying molding compound is provided. The solidifying molding compound can be a plastics material or plastics material mixture. The molding compound can be supplied in substantially liquid form and then solidify to form an object or component that in particular is dimensionally stable. The device can generally be based on an injection molding principle or be configured to perform an injection molding process or a process that is at least similar to injection molding. In particular, the device can for this purpose be capable of being connected to known injection units or screw arrangements of an injection molding machine. As is stated hereinbelow, the objects can be generally elongate components such as profiles, cables, hoses or the like.

The device comprises a feed region with at least one sprue point for supplying the molding compound. The feed region can, as mentioned, be capable of being connected to an injection unit of an injection molding machine. The feed region can further be part of a molding arrangement of the device. According to a variant, the device comprises a molding arrangement comprising two mold halves which are movable towards one another and can be lifted off one another. The mold halves are capable of being arranged in known manner on clamping plates of a conventional injection molding machine or can comprise such clamping plates. In this case, the feed region can be provided on or in at least one of the mold halves. The molding arrangement may, however, also comprise any desired number of mold parts. For example, the molding arrangement can be of three- or four-part construction. In the following, the expression mold part, unless indicated otherwise, can include corresponding mold halves (that is to say only two mold parts) but also a plurality exceeding two, such as, for example, three or four mold parts.

The sprue point can further be a fluid-conducting connecting region, in particular in the form of a channel, a bore, an opening and/or a hollow space. The sprue point can be capable of being connected to the outlet region of molding compound from a conventional injection unit of an injection molding machine and can guide the molding compound into a mold insert described hereinbelow.

The device further comprises a mold insert which delimits at least in part a cavity in which the molding compound supplied via the sprue point can be received. The mold insert can interact with any mold parts (e.g. mold halves) and/or clamping plates of the device and can be displaceably insertable therein. The mold insert can delimit the cavity completely or at least in part. The cavity can thereby define a hollow space and corresponding wall regions delimiting the hollow space, which wall regions mold outer, or peripheral, regions of the object that is to be produced. To that end, the wall regions can in known manner define a shape or contour of the solidifying molding compound.

The cavity comprises at least one object molding region, which molds the object that is to be produced, and at least one distribution region, which is adapted to guide supplied molding compound to the object molding region. The object molding region can be a region which comprises wall regions which define the shape of the solidifying molding compound in the above-mentioned manner and accordingly also specify at least in part the shape of the object produced therefrom. As explained hereinbelow, the object molding region can be substantially elongate and have a cross-section which is constant or varying and in particular is rotationally symmetrical in part. For example, the object molding region can comprise an elongate and in particular tubular hollow space. The mold insert can further comprise two mold parts (also called insert mold halves in the following) which, in assembled form, are able to delimit the object molding region and which can be separated from one another for removal of an object molded therein. Analogously to the statements above, any desired plurality of mold parts can be provided. For example, the mold insert can be of three- or four-part construction. Each mold part can thereby delimit the cavity and/or the object molding region at least in part. In the following, the expression insert mold part, unless indicated otherwise, can include corresponding insert mold halves (that is to say only two insert mold parts), but also a plurality exceeding two, such as, for example, three or four insert mold parts.

The distribution region can be a hollow space which is so arranged that molding compound supplied and in particular injected via the sprue point can be guided into the object molding region. Accordingly, the distribution region can also be referred to as a sub-distributor or sprue channel region. The distribution region can further be connected or connectable in a fluid-conducting manner to the object molding region. For example, the distribution region and the object molding region (or the hollow spaces delimited thereby) can merge into one another. The distribution region can receive molding compound substantially directly from the sprue point and/or can be indirectly connected thereto, for example via a portion of the object molding region. Furthermore, an object molding region can be supplied with molding compound via a plurality of distribution regions, which can take place simultaneously or in succession. Overall, molding compound can thus pass from the sprue point via the distribution region into the object molding region, in order to fill the object molding region in particular continuously with molding compound. Furthermore, the molding compound solidifying in the object molding region can generally define the end product, or the object that is to be produced, while any molding compound solidifying in the distribution region can form a sprue contour which is not desired on the end product.

The device further comprises at least one pusher device which is configured, in a first position, to allow the object molding region and the distribution region to be connected and, in a second position, to separate the object molding region and the distribution region from one another. To that end, the pusher device can be configured, in the second position, to engage into the cavity and in particular into a possible connection or transition region between the distribution region and the object molding region, or, in other words, to extend into such a region. In the first position, on the other hand, the pusher device can be arranged substantially outside the cavity and in particular outside a possible connection or transition region between the distribution region and the object molding region. The pusher device can further permit a fluid-conducting connection between the object molding region and the distribution region in the first position, but prohibit such a connection at least in part in the second position.

The pusher device can generally be movable between the first and second position (and/or vice versa). The movement can thereby take place along an axis which runs at an angle to a movement axis, discussed hereinbelow, of the mold insert and/or a longitudinal axis of the cavity. This can take place in particular substantially transversely or at an angle of approximately 90° to the mentioned axes.

The pusher device can further be configured to cut through an already solidified or still liquid molding compound between the distribution region and the object molding region. This can take place on movement of the pusher device from the first position into the second position. For this purpose, the pusher device can comprise a separating or blade region. That region can form a portion of the pusher device that faces the cavity and in particular is displaceable therein. In general, the pusher device can be arranged in the mold insert and in particular in a receiving region and/or a recess formed therein. Furthermore, the pusher device can be arranged substantially in only one of the possible insert mold parts of the mold insert.

The mold insert is further movable relative to the feed region along a movement axis. For this purpose, the mold insert can be arranged between possible mold parts and in particular possible mold halves of the device and can be displaceable relative thereto. Guiding arrangements, guide rails, sliding surfaces, slide arrangements or the like which are suitable for that purpose can further be provided within the device. The relative movement can take place substantially linearly. In the case of mold parts (or mold halves) which are movable towards one another and can be lifted off one another, the movement axis of the relative movement can run at an angle to the corresponding closing/opening axis of the mold halves, for example at an angle of between approximately 45° and approximately 90° or substantially orthogonally thereto.

The relative movement can be accompanied by a change in the size of the cavity and in particular a lengthening along the movement axis. Alternatively or in addition, the relative movement can be accompanied by a change in the relative positioning of the distribution region and the sprue point. This can include the establishment for the first time and/or the enlargement of a fluid-conducting connection between the distribution region and the sprue point, whereby the distribution region and the sprue point can be located, for example, substantially opposite one another for that purpose. As explained hereinbelow, it is also possible to provide a plurality of distribution regions which, within the scope of the relative movement, can be arranged in succession in a desired manner relative to the sprue point. This can take place in particular in that a fluid-conducting connection between one of the distribution regions and the sprue point is made possible in succession.

It can further be provided that molding compound is supplied in particular continuously via the sprue point at least over a predetermined portion of the relative movement. This can include a predetermined movement distance, but also a predetermined period of time of, for example, more than approximately 1 second, more than approximately 2 seconds or more than approximately 3 seconds.

The pusher device is further actuatable according to the relative movement. It can accordingly be provided that the pusher device assumes a desired one of the first and second positions according to the relative movement, for example in dependence on a movement distance that has been covered and/or a period of time that has elapsed. Likewise, this can include actuatability on assumption of a desired relative position between the mold insert and the feed region and in particular between the distribution region and the sprue point. In other words, the pusher device can be selectively actuatable to assume the first and/or second position, whereby the actuation can generally be dependent on a parameter of the relative movement.

According to a variant it is provided that the pusher device is adapted to assume the first position at the latest when the mold insert is moved in such a manner that the distribution region and the sprue point are connected together in a fluid-conducting manner (for example because they are located substantially opposite one another). Before that state is reached, on the other hand, it can be provided that the pusher device assumes the second position, so that the pusher device is as it were selectively opened.

Alternatively or in addition, it can be provided that, after a movement of the mold insert such that a fluid-conducting connection between the distribution region and the sprue point is removed again, the pusher device is adapted to assume the second position. The pusher device can accordingly again selectively be closed when no further molding compound can be supplied via the distribution region. This can follow the above-mentioned assumption of the first position to establish the fluid-conducting connection. In general, it can further be provided that the assumption of the second position takes place when the molding compound in the distribution region is not yet completely solidified.

According to a further development, the object molding region is configured to produce a substantially elongate object, and the movement axis extends substantially parallel to a longitudinal axis of the object or coincides therewith. As mentioned, the object can be a cable, whereby the solidifying molding compound can form a sheath of the cable. The sheath can in particular enclose internal conductors and/or cores of the cable, which are arranged inside the cavity beforehand and can extend along the object molding region. The object molding region can further have varying cross-sectional dimensions in order to form, for example, plug or bush portions of the cable.

The pusher device can further be actuatable in such a manner that it changes at least temporarily from the first position to the second position or vice versa. For example, the pusher device can be arranged in a basic state in the first position and can be movable into the second position at least temporarily according to the relative movement. Likewise, the pusher device can be arranged in a basic state in the second position and can be movable into the first position at least temporarily according to the relative movement. The pusher device can thereby in each case also return into the position according to its basic state, in particular when the molding compound supply operation via the associated distribution region and/or solidification of the molding compound is complete.

According to one example, the pusher device is actuatable in such a manner that it assumes the second position at least once the sprue point has supplied molding compound to the distribution region. This can relate in particular to a time at which the supply of a predetermined amount or of a predetermined volume of molding compound into or via the distribution region is complete. Furthermore, this can take place at a time at which the molding compound is at least not yet sufficiently solidified. This can also take place when the distribution region is moved away from the sprue point within the scope of the relative movement, so that, for example, there is no longer a fluid-conducting connection therewith. In general, it can be provided that the pusher device then remains in the second position, for example until production of the object (or solidification of the molding compound) is complete.

In general, it can be provided that the pusher device is fluidically, pneumatically and/or electrically actuatable. However, it can be provided, alternatively or in addition, that the pusher device is mechanically actuatable, in particular on the basis of a force generated within the scope of the relative movement. For example, a force can be generated within the scope of the relative movement that acts on the pusher device in such a manner that the pusher device is moved out of its current position into the respective other of the first and second positions. This force can be generated, for example, by contact with and/or abutment of the pusher device on a region of the device. Within the scope of the relative movement, such contact or abutment can be built up and/or enhanced.

According to a further variant, the pusher device comprises an actuating portion which is configured to interact, at least within the scope of the relative movement, with an actuating region of the device, and in particular wherein the interaction includes an at least temporary abutment and/or engagement between the actuating region and the actuating portion. In other words, the interaction can include contact between and/or an at least indirect abutment of the actuating portion and the actuating region. The actuating region can be comprised in the feed region or arranged thereon and can move relative to the actuating portion generally within the scope of the relative movement. For example, the actuating region can be formed or arranged on a surface of the feed region that faces the mold insert.

In order to provide at least temporary engagement, one of the actuating region and the actuating portion can comprise a convex and/or protruding region, whereby, optionally, the respective other of the actuating region and the actuating portion can comprise a concave region and/or a region provided with a suitable recess.

In this connection, the interaction can include a movement of the actuating portion (and/or of the pusher device) or generate such a movement, whereby the movement can take place at an angle to the movement axis and in particular substantially orthogonally to the movement axis. The actuating portion can transmit the movement to the pusher device and/or at least to a separating or blade region thereof, so that that region is displaceable into the cavity. The pusher device and/or the separating region thereof can likewise move at an angle to the movement axis and in particular substantially orthogonally thereto. Furthermore, the movement of the actuating portion can be accompanied by a change between the first and second positions of the pusher device or vice versa.

The actuating region can further comprise a contoured control region which is configured to interact with the actuating portion. The control region can in particular interact with the actuating portion in such a manner that a predetermined movement or movement sequence of the actuating portion and/or of the pusher device is generated within the scope of the relative movement. In this case too, the interaction can include at least temporarily direct contact and/or at least indirect abutment between the control region and the actuating portion. The control region can in particular comprise a contoured recess, groove, edge and/or a profiled surface region. Furthermore, the actuating portion can engage into the control region and/or come into contact therewith and, for example, be guided along the control region within the scope of the relative movement.

According to a variant, the control region comprises a control curve. This can extend substantially along the movement axis and, optionally, at least in part also at an angle thereto. Alternatively, the control curve can also be referred to as a slotted link or slotted link guide or can be part of such a slotted link or slotted link guide.

Furthermore, the control curve can comprise generally non-deflecting portions, which can extend, for example, substantially along the movement axis, and also deflecting portions, which can extend at an angle to the movement axis. Within the scope of the relative movement, the actuating portion can interact both with the non-deflecting portions and with the deflecting portions in order to achieve a desired movement or movement sequence. For example, the actuating portion can assume a basic position upon interaction with the non-deflecting portions and be moved out of the basic position upon reaching the deflecting portions. In particular, it can be provided that the actuating portion, upon reaching the deflecting portions, is moved in such a manner that the pusher device changes from the first position into the second position or vice versa.

According to a further aspect, the pusher device is biased into one of the first position and the second position and, optionally, is movable into the respective other position according to the relative movement. The biasing can take place by means of a suitable biasing device, for example a fluidic or pneumatic pre-pressure or a mechanical spring element. The biasing force can be such that the forces generated and/or acting within the scope of the relative movement can purposively overcome the biasing force in order to move the pusher device into the respective other (non-biased) position.

According to a further development, the object molding region is configured to mold the object along at least half of its length and in particular to mold it substantially along its entire length. The object molding region can be formed at least in part and, optionally, for the most part or substantially completely in the mold insert. For example, the object molding region can be delimited by any insert mold parts of the mold insert. Accordingly, the mold insert, or the object molding region delimited thereby, can mold the object along its entire length or at least along a predominant portion of its length. This can take place via the above-mentioned wall regions of the object molding region, which can specify the shape of outer regions and/or the peripheral region of the object.

The feed region can further be formed in a substantially fixed portion along the movement axis. In other words, it can be provided that the feed region, when viewed along the movement axis, assumes a substantially unchangeable position. The feed region, on the other hand, can move transversely to the movement axis, for example when it is arranged on mold parts of the device which are movable towards and away from one another. According to this variant, the relative movement thus takes place substantially by a movement, or linear displacement, of the mold insert relative to the substantially fixed (at least when viewed along the movement axis) feed region.

According to a further development, the device comprises a plurality of distribution regions each with a pusher device, in particular wherein the distribution regions are arranged one behind the other along the movement axis and are each actuatable within the scope of the relative movement. For example, it can be provided that the distribution regions are arranged one behind the other along a common line which (optionally) runs parallel to the movement axis or an object longitudinal axis. The distribution regions can further be arranged one behind the other, or be spaced apart from one another, at regular intervals. The pusher devices (or at least any separating or blade regions thereof) can further be arranged substantially in a common plane, or at a common height relative to the movement axis. Likewise, the positions of the pusher device (or at least of any separating or blade regions thereof) can, however, be adapted to associated cross-sectional dimensions of the object molding region, in particular to varying cross-sectional and/or diameter dimensions thereof. This can include arrangement at different levels or heights.

In general, the mold insert can comprise two insert mold halves which can be fitted together along a parting plane, and the distribution region or the plurality of distribution regions extend(s) at least in part in the parting plane. Likewise, the mold insert can comprise a plurality of insert mold parts, of which at least two can be fitted together in the above-mentioned parting plane. In the case of a plurality of distribution regions, they can be arranged one behind the other along the parting plane or, in other words, arranged one behind the other along a common line which runs inside or parallel to the parting plane.

Within the scope of the relative movement, it can thus be provided that the sprue region is connected in a fluid-conducting manner with each of the distribution regions in succession and supplies molding compound to the object molding region, so that the object molding region is gradually filled. Interaction with each of the pusher devices, or the actuating portions thereof, in succession can thereby also take place, in order to actuate them in the desired manner. For example, the sprue region can interact with the respective actuating portions of the pusher devices via a control region described above, and in particular can move them in succession (and/or at least in part simultaneously) in a predetermined manner. As a result, the pusher devices can be brought into a desired position at predetermined times and/or at predetermined relative movement states, in particular depending on which distribution region is currently close to the sprue point or being moved towards or away from the sprue point.

It can further be provided that the device is configured to move at least one of the plurality of pusher devices into the first position, wherein that pusher device is associated with a distribution region through which a molding compound is to be supplied directly, and wherein at least one further pusher device assumes or is moved into the second position. In particular, it can be provided that, when viewed along the movement axis, a pusher device immediately following or immediately preceding the pusher device that has been moved into the first position assumes or is moved into the second position. This can prevent unsolidified molding compound from escaping from the object molding region via the distribution regions associated with those further pusher devices when further molding compound is supplied.

In a variant, the device is configured to move only one of the plurality of pusher devices completely into the first position within the scope of the relative movement, while the remaining pusher devices assume the second position. It will be noted, however, that it is also possible to provide a plurality of sprue points and to move into the first position in each case only those pusher devices that are associated with a distribution region via which moulding compound is currently to be supplied by means of one of the sprue points.

A further development provides that the pusher device, in a region facing the object molding region, has a shape corresponding to an adjacent portion of the object molding region. This can concern in particular regions of the pusher device that reach directly into the cavity at least when the second position is assumed, such as, for example, a possible separating or blade region. Furthermore, the facing region of the pusher device can at least in part delimit and/or engage into the object molding region at least when the second position is assumed. Correspondingly, the facing region of the pusher device can also specify at least in part an outside shape, or a peripheral region, of the object that is to be produced.

The adjacent portion of the object molding region can in particular be an adjacent (or surrounding) wall region which, as explained above, can specify the shape of an outside region of the object that is to be produced. For example, the adjacent portion, or wall region, can be curved, and the pusher device can be configured with a corresponding curvature. In particular when the pusher device assumes the second position even when at least partially as yet unsolidified molding compound is present, it can thus be ensured that a desired shape of the object that is to be produced is achieved even after separation from the distribution region.

The disclosure relates further to a method for producing objects from a solidifying molding compound by means of a device, wherein the device comprises a feed region having at least one sprue point for supplying the molding compound, and a mold insert which delimits at least in part a cavity in which the molding compound supplied via the sprue point can be received, wherein the cavity comprises at least one object molding region, which molds the object that is to be produced, and at least one distribution region, which is adapted to guide supplied molding compound to the object molding region, and further comprises at least one pusher device which is configured, in a first position, to allow the object molding region and the distribution region to be connected and, in a second position, to separate the object molding region and the distribution region from one another. The method comprises the following steps:

moving the mold insert relative to the feed region along a movement axis, and actuating the pusher device according to the relative movement.

It will be appreciated that the method can comprise further steps in order to achieve each of the above-mentioned effects, working steps and/or operating states of the device. The same applies to the aspects of the exemplary embodiments described hereinbelow.

For example, additional steps of bringing a control region of the feed region and an actuating portion of the pusher device into engagement and/or moving such an actuating portion according to the above-mentioned aspects can be provided. This can likewise include steps of moving or producing a movement sequence of the pusher device between the first and second positions according to one of the variants discussed hereinabove and/or hereinbelow.

The present disclosure will be explained in greater detail by means of figures, in which, in schematic form.

In the following, without being limited thereto, specific details are described in order to provide a complete understanding of the present disclosure. It is, however, clear to a person skilled in the art that the present disclosure can be used in other exemplary embodiments which may differ from the details set out hereinbelow. For example, specific configurations and forms of a device and of a method are described hereinbelow, which are not to be regarded as being limiting. Furthermore, different fields of use of the device are conceivable. Purely by way of example, there may be mentioned at this point the production of cables, hoses or elongate plastics profiles.

Figure 1:
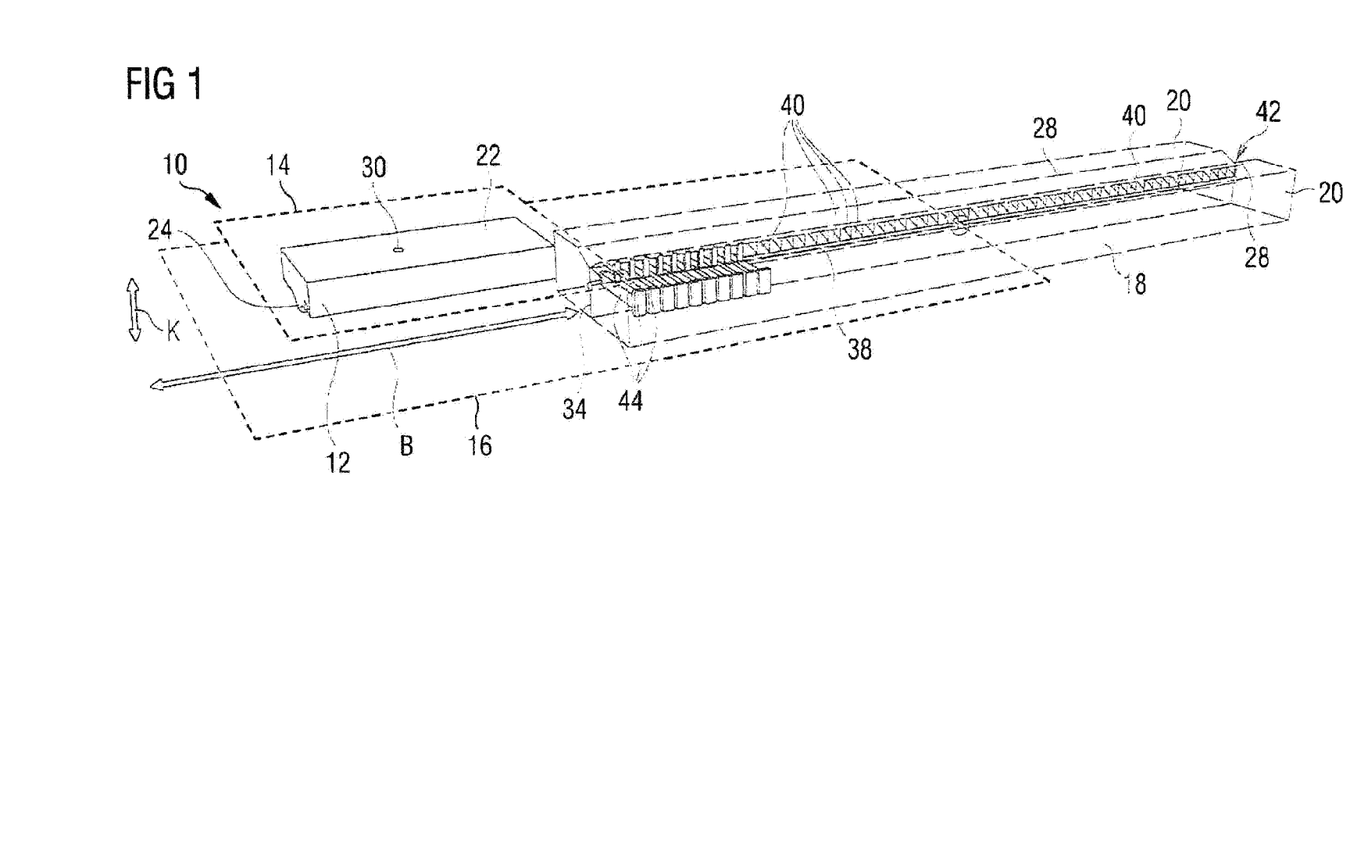
FIG. 1 is a partial sectional view of a device according to a first exemplary embodiment.

FIG. 1 is a schematic partial sectional view of a device 10 according to a first exemplary embodiment. The device 10 comprises a feed region 12, which is arranged on a top mold half 14 which is indicated only schematically. The device 10 further comprises a bottom mold half 16, indicated schematically, which is located opposite the top mold half 14. The top mold half 14 is arranged in known manner on a fixed clamping plate (not shown) of an injection molding machine, while the bottom mold half 16 is arranged on a movable clamping plate (likewise not shown). The top and bottom mold halves 14, 16 are thus movable towards one another and away from one another in known manner along the axis K. It will be noted that the mold halves 14, 16 may also be of the same size, in particular as regards their respective mutually parallel base surfaces. In FIG. 1, however, these are depicted with dimensions which differ from one another for reasons of the representation. The device 10 may also comprise more mold parts than the mold halves 14, 16 shown.

The device 10 further comprises a mold insert 18, which is composed of two insert mold halves 20. However, in this case too, the mold insert 18 can comprise more mold parts than the insert mold halves 20 shown, such as, for example, three or four mold parts. The mold insert 18 is linearly displaceable along a movement axis B and thus relative to the feed region 12 via guide rails (not shown separately) on the bottom mold half 16. The feed region 12, on the other hand, is configured to be generally fixed when viewed along the movement axis B. A movement of the mold insert 18 to produce an object takes place in FIG. 1 along the movement axis B to the right. It will be noted that the movement axis B runs orthogonally to the opening/closing axis K of the mold halves 14, 16.

In the present case, the feed region 12 comprises a block-shaped base body 22 with a guide region 24 which protrudes in the direction towards the mold insert 18 and extends along the movement axis B. As will be further apparent when considering FIG. 2, the guide region 24 comprises two guide surfaces 26 which can be brought into contact with contact surfaces 28 of the mold insert 20. All the guide surfaces 26 and contact surfaces 28 extend along the movement axis B. The guide surfaces 26 and contact surfaces 28 are so angled relative to the mold halves 14, 16 that they together form a linear guide with a V-shaped cross-sectional or engagement structure. This can also be referred to as a prismatic guide or V-shaped prismatic guide.

It will further be seen in FIG. 1 that the base body 22 of the feed region 12 comprises a feed opening 30 into which a solidifying molding compound in still liquid or viscous form can be injected via an injection unit (not shown) of a conventional injection molding machine. It is clear from FIG. 2 that a sprue point 32 is formed opposite the feed opening 30, through which the solidifying molding compound can be supplied to the mold insert 20. The feed opening 30 and the sprue point 32 are connected by a straight through-channel.

Figure 2:
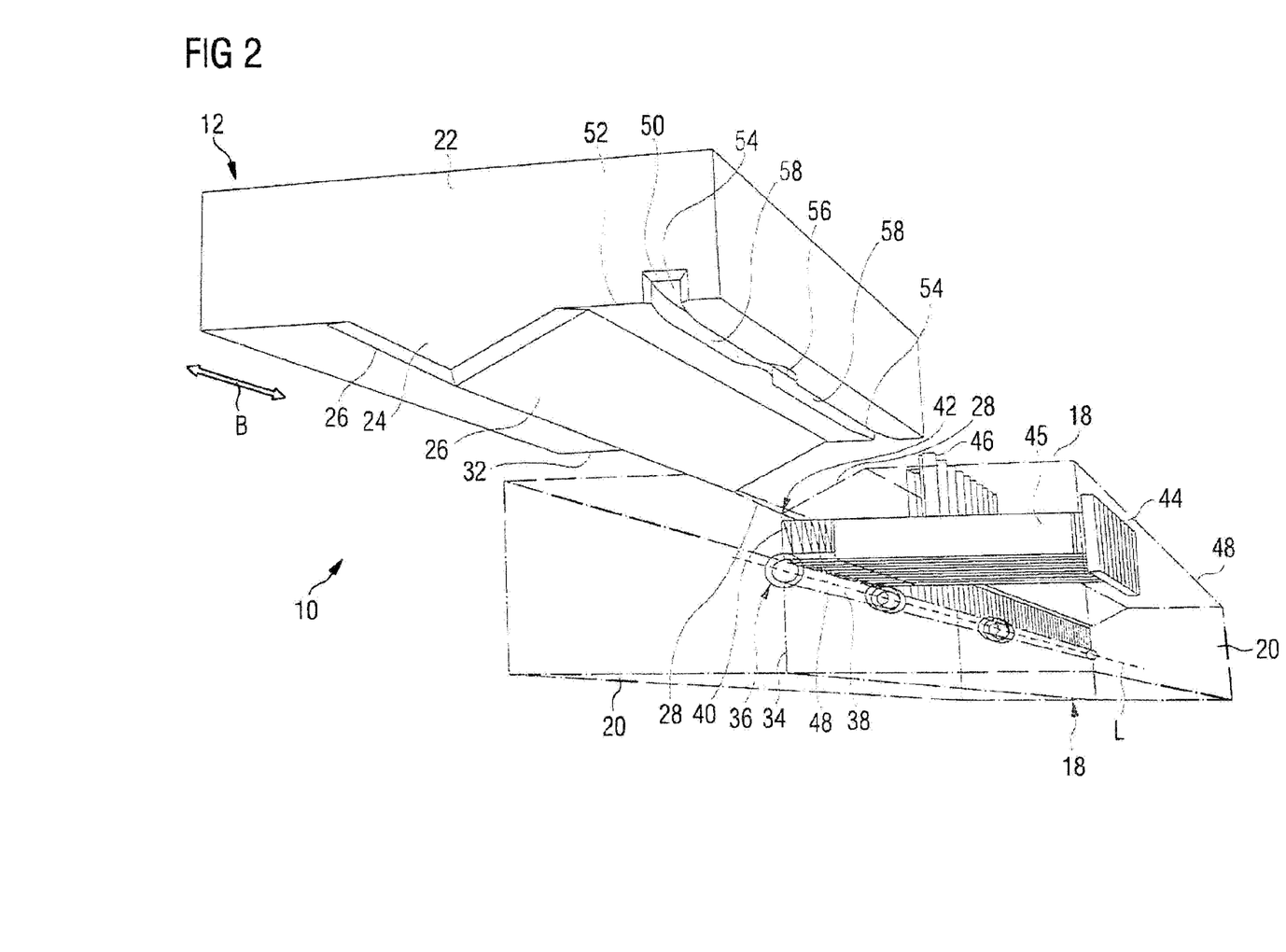
FIG. 2 is a further partial sectional view of the first exemplary embodiment, in particular in order to explain a control curve.

When FIGS. 1 and 2 are considered together it will further be seen that the insert mold halves 20 of the mold insert 18 are fitted together along a common parting plane 34 and are pressed together along that parting plane 34 by cylinder units (not shown). They thereby each delimit in part a cavity 36 in which the solidifying molding compound can be received in the mold insert 20. The cavity 36 thereby defines a hollow space which has (inner) wall regions which define a shape of the solidifying molding compound. Concretely, the cavity 36 comprises an object molding region 38 and a plurality of distribution regions 40 which are arranged one behind the other along the movement axis B. For reasons of clarity, only selected distribution regions 40 are provided with a corresponding reference numeral in FIGS. 1-3.

The object molding region 38 is of generally elongate and also tubular form and has a circular cross-section, the cross-sectional dimensions of which vary along the movement axis B. Correspondingly, the object molding region 38 defines an object longitudinal axis L which extends along and through the tubular object molding region 38, as shown in FIG. 2. The object longitudinal axis L coincides with the movement axis B of the mold insert 18.

The object molding region 38 further comprises (inner) wall regions which specify the shape of the solidifying molding compound and thus an outer, or peripheral, shape of the object that is to be produced. In the case shown, the object that is to be produced is a cable, the conductors of which (not shown separately) are so arranged beforehand that they extend through the object molding region 38 and along the movement axis 13. The solidifying molding compound comprises a plastics material which settles around the conductors of the cable inside the object molding region 38 and thus encloses and sheathes them.

The distribution regions 40 extend substantially perpendicularly to the movement axis B and the object longitudinal axis L and thereby connect the object molding region 38 to a transition region 42 between the two guide surfaces 28 of the mold insert 18. Since, as shown in FIG. 2, the sprue point 32 is located directly opposite this transition region 42, or can be brought into alignment therewith, molding compound injected via the sprue point 32 can enter a distribution region 40 currently situated opposite the sprue point 32 and thus be supplied to the object molding region 38. In other words, a distribution region 40 can in each case be connected in a fluid-conducting manner to the sprue point 32 within the scope of the relative movement.

It will further be seen from FIGS. 1 and 2 that the distribution regions 40 are arranged one behind the other at regular intervals from one another along the movement axis B and the object longitudinal axis L. Within the scope of the relative movement of the mold insert 18 to the feed region 12, the sprue point 32 thus comes into contact with, or into a position directly opposite, the individual distribution regions 40 in succession and can thus, in particular in the case where molding compound is supplied continuously, supply a corresponding volume of molding compound to each of the distribution regions 40 in succession. Accordingly, the object molding region 38 can be filled gradually with molding compound via the individual distribution regions 40, so that the object formed therein (or the molding compound received in the object molding region 38 for that purpose) as it were continuously becomes longer.

Figure 3:
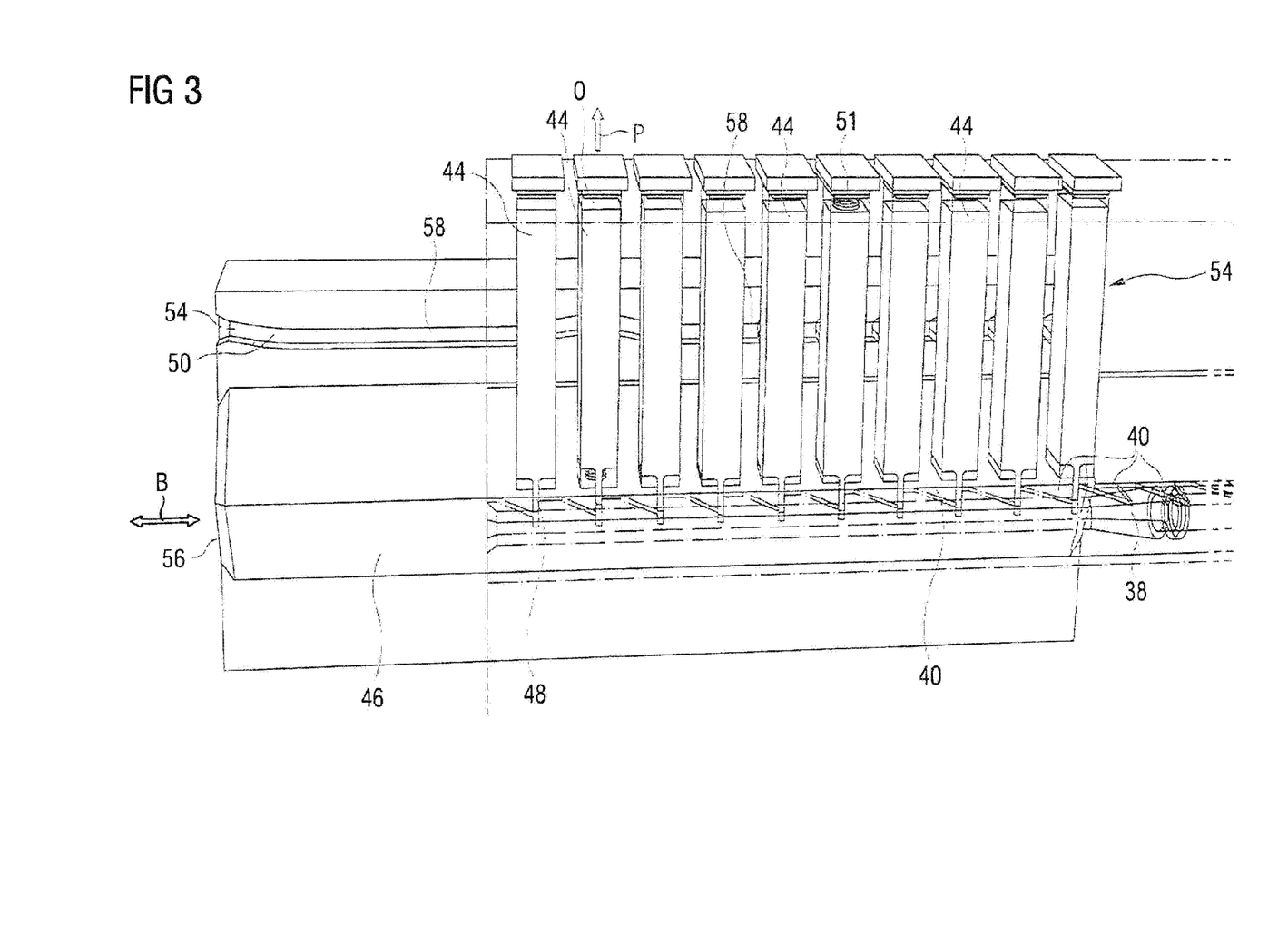
FIG. 3 is a further partial sectional view of the first exemplary embodiment, in particular in order to explain different positions of the pusher devices.

FIGS. 1-3 further show pusher devices 44 which are arranged in one of the insert mold halves 20 of the mold insert 18. It will be noted that only some pusher devices 44 are shown and only selected of those pusher devices 44 are provided with corresponding reference numerals. In principle, however, each of the distribution regions 40 has its own associated pusher device 44. It should further be emphasized that in particular the mold insert 18 in FIGS. 1-3 is shown in a partial sectional view, or a partially transparent representation. This serves the purpose of explaining in greater detail the pusher devices 44, which are each received in individual recesses within the mold insert 18 which are not visible from outside.

In FIG. 2, it will be seen that the pusher devices 44 each comprise a block-shaped base body 45 which extends substantially transversely to the parting plane 34 of the mold insert 18 and transversely to the movement axis B and the object longitudinal axis L. Furthermore, a cylindrical and pin-shaped actuating portion 46 extends substantially perpendicularly to the base body 45 and thereby protrudes beyond an upper side 48, facing the feed region 12, of the mold insert 18. Finally, the pusher devices 44 each comprise a thin-walled protruding separating region 48 which, as explained hereinbelow, is configured to extend selectively into the cavity 36.

Figure 5:
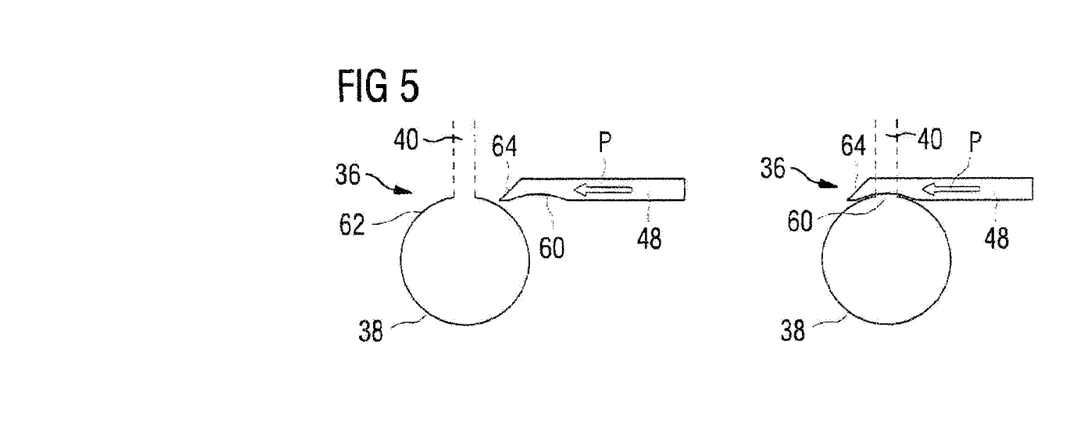
FIG. 5 shows partial views of a separating portion of a pusher device according to the first exemplary embodiment on assumption of a first and a second position.

The possible positions of the pusher devices 44 are clear from FIGS. 3 and 5. Referring firstly to FIG. 5, the case on the left shows a cross-sectional representation of the object molding region 38 and the distribution region 40 opening into it. The pusher device 44, and in particular the separating region 48 thereof, on the other hand, is arranged inside the recess in the corresponding insert mold half 20 that receives the pusher device 44 and thus does not project into the cavity 36 of the mold insert 18. In this case, the distribution region 40 and the object molding region 38 are connected together in a fluid-conducting manner, so that the still liquid molding compound can pass from the sprue point 32 of the feed region 12 directly into the object molding region 38. This corresponds to a first position or open position of the pusher device 44.

In the case on the right in FIG. 5, on the other hand, the separating region 48 is displaced into the cavity 36. It thereby separates the distribution region 40 and the object molding region 38 from one another in such a manner that a fluid-conducting connection between those regions is no longer possible. This corresponds to a second or closed position of the pusher device 44.

A change of the separating region 48 from the first position into the second position takes place along an arrow P, which runs transversely to the parting plane 34 and also to the movement axis B. Furthermore, the pusher device 44 is largely rigid in form, so that the base body 45, actuating portion 46 and separating region 48 thereof are together displaced according to the arrow P.

With reference to FIG. 3, the pusher device 44 shown as the second from the right, for example, which is additionally provided with the reference symbol O, is in the first, open position. All the other pushing device 44 along the entire length of the object molding region 38, on the other hand, are in the closed, second position. It will be noted that the pusher devices 44 are each biased into that closed, second position by a spiral spring element 51, such a spiral spring element 51 being shown schematically in FIG. 3 only for a single pusher device 44. As will be explained hereinbelow, the pusher devices 44 are accordingly opened and moved into the first position only selectively according to the movement of the mold insert 18, namely only when the distribution regions 40 associated with the pusher devices 44 are connected in a fluid-conducting manner to the sprue point 32 or are located opposite the sprue point.

In FIG. 2 it will further be seen that the feed region 12 has a control curve, or slotted link 50, which is formed on an underside 52, facing the mold insert 18, of the base body 22 of the feed region 12. The control curve 50 is thus arranged generally adjacent to one of the guide surfaces 26 of the feed region 12. The control curve 50 forms a contoured control region of the feed region 12, in order to perform the movements of the pusher devices 44 explained hereinbelow.

Firstly, it will be seen that the control curve 50 is in the form of a generally elongate groove which extends substantially along the movement axis B, or the object longitudinal axis L. In its respective (axial) end region 54, the control curve is slightly widened and bent and has rounded edges. This is intended to facilitate engagement with the actuating portions 46 of the pusher devices 44. The control curve 50 further comprises a middle region 56 which is in part angled relative to the movement axis B. The angled region merges on both sides into regions 58 of the control curve 50 which extend linearly along the movement axis B, each of which regions opens into the end region 54.

The angled region 56 forms a generally convex or bulging portion of the control curve 50. This region is further to be of such a size that only one of the actuating portions 46 of the pusher devices 44 can be located therein at any one time, while the further actuating portions 46 are located in the other regions of the control curve or are wholly outside the control curve.

As is further apparent from FIG. 3, the pusher devices 44 are in their closed, second position as long as the actuating portions 46 thereof are in engagement with the straight regions 58 of the control curve 50. As explained, the same is also true for pusher devices 44 arranged wholly outside the control curve 50. The straight regions 58 thus form non-deflecting portions of the control curve 50, in which no targeted forces are exerted on the actuating portions 46 engaged therewith, apart from movement forces for purposively moving the actuating portions 46 and associated pusher devices 44.

If, on the other hand, the actuating portion 46 of a pusher device 44 comes into engagement with the angled region 56 of the control curve 50, a targeted movement force is exerted thereon, which force acts according to arrow P in FIGS. 3 and 5 substantially transversely to the parting plane 34 and the movement axis B. This movement force is directed away from the parting plane 34 and the object molding region 38, so that the corresponding pusher device 44 is moved into the open, first position and the separating region 48 thereof is moved out of the cavity 36. Since the angled region 36 is formed in a common cross-sectional plane with the sprue point 32, the cross-sectional plane being perpendicular to the movement axis B, only the pusher device 44 whose associated distribution region 40 is directly opposite the sprue point 32 and is in fluid-conducting connection therewith is moved into the open, first position. It is thus possible selectively to actuate only the pusher device 44 via which, or along which, a molding compound volume is currently to be supplied to the object molding region 38 (see pusher device O in FIG. 3). By contrast, as soon as the actuating portion 46 reaches the straight region 58 of the control curve 50 again, the corresponding pusher device 44 again assumes its closed, second position.

Figure 4:
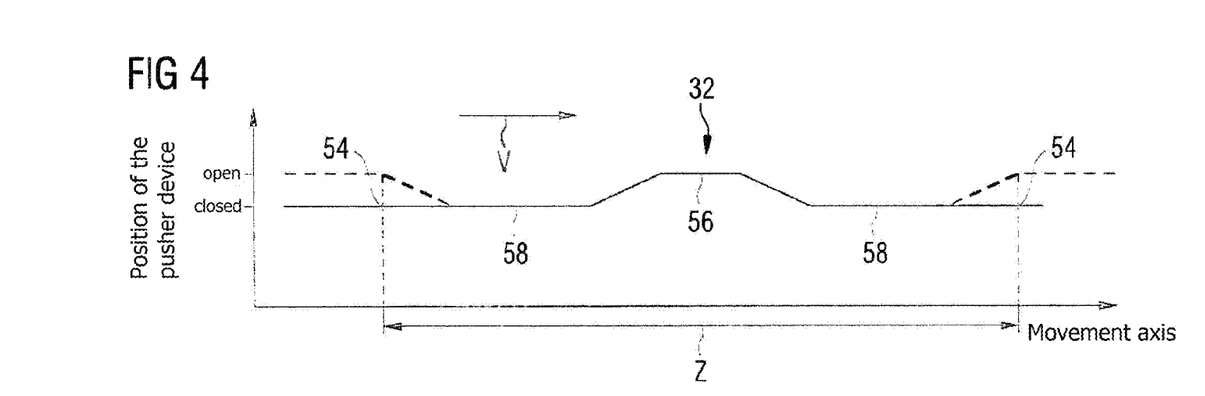
FIG. 4 is a diagram to explain the positions of the pusher devices within the scope of a relative movement according to the first exemplary embodiment.

This is further clear from the diagram of FIG. 4, which shows the positions of the pusher devices 44 along the movement axis B. In the diagram, the positions of the pusher devices 44 between "open" (first position) and "closed" (second position) are plotted on the Y-axis, the X-axis relating to positions along the movement axis B. Region Z along the movement axis denotes a region of pusher devices 44 which are straddled by the feed region 12 and which are currently in engagement with the control curve 50. An arrow V further corresponds to a movement direction of the feed region 12 relative to the mold insert 18. A further vertical arrow represents the molding compound supplied via the sprue point 32.

When viewed from left to right along the movement axis there will be seen in FIG. 4 a first end region 54 of the control curve 50, which comes into engagement with the actuating portions 46 of the individual pusher devices 44 without initially moving them out of the closed, second position. The same is true for the straight regions 58, along which the pusher devices 44 each remain in the closed, second position. If, however, the angled region 56 is reached, the corresponding actuating portion 46, and thus also the associated pusher device 44, are moved into the open position, so that the molding compound supplied via the sprue point 32 is able to enter the object molding region 38. After the angled region 56 when viewed in the movement direction V, on the other hand, the pusher devices 44 again assume their closed, second positions. The still liquid molding compound in the distribution regions 40 is thereby separated from the object molding region 38, so that no troublesome sprues are formed on the object.

Keeping the pusher devices 44 predominantly closed further has the advantage that an after-pressure can be built up in known manner, in particular close to an axial end region of the object that is to be produced, in order to ensure that the mold is filled sufficiently by the supplied molding compound. However, because the pusher devices 44 are predominantly closed, it is possible to prevent molding compound from escaping in an undesired manner from the object molding region 38 via the further distribution regions 40.

As an alternative, a path is shown by a broken line in FIG. 4 close to each of the end regions 54, whereby the end regions 54, on coming into engagement (right-hand end region 54), first move the pusher devices 44 into the closed position and, on coming out of engagement (left-hand end region 54), move the pusher devices 44 into the open position again. However, it can also be provided that the second position is maintained and no return movement takes place by means of the left-hand end region 54.

Returning to FIG. 5, it will be seen, finally, that the separating region 48, in a region 60 facing the object molding region 38, is curved corresponding to an adjacent wall region 62 of the object molding region 38. The separating region 48, in the right-hand position in FIG. 5, which corresponds to the closed, second position of the pusher device 44, thereby also delimits in part the object molding region 38 in the corresponding cross-sectional plane. The separating region 48, or the facing region 60, thus also molds in part the solidifying molding compound and the object produced thereby. However, because of the corresponding curvature, this takes place without substantial burrs or flaws on the surface of the object.

It will likewise be seen that the separating region 48 is configured with a sharp contour at its free end 64. This serves as a blade, in order easily to be able to cut through liquid and/or already solidified molding compound. The contour of the free end is thereby so chosen, or bevelled, that the molding compound can be displaced in the direction towards the distribution region 40.

With the above solution, molding compound from the distribution region 40 can be separated from the object molding region 38 directly during the casting operation, so that no troublesome contours in the form of solidified sprues are left on the cable components that are produced. The cables can thus be removed directly from the mold insert 18, after the insert mold halves 20 have been separated, without such is sprues having to be removed subsequently by additional post-processing operations. The formation of such sprues is instead prohibited from the outset by the above-described actuation of the pusher devices 44 according to the relative movement.

The invention claimed is:

1. A device for producing objects from a solidifying molding compound, comprising:
   a feed region with at least one sprue point for supplying the molding compound, and
   a mold insert which delimits at least in part a cavity in which the molding compound supplied via the sprue point can be received,
   wherein the cavity comprises at least one object molding region, which molds the object that is to be produced, wherein the object molding region is configured to produce a substantially elongate object, and at least one distribution region, which is adapted to guide supplied molding compound to the object molding region, and further comprising at least one pusher device which is configured, in a first position, to allow the object molding region and the distribution region to be connected and, in a second position, to separate the object molding region and the distribution region from one another,
   wherein the mold insert is movable relative to the feed region along a movement axis,
   Wherein the movement axis extends substantially parallel to a longitudinal axis of the object,
   wherein the pusher device is actuatable according to the relative movement, and
   wherein the device comprises a plurality of distribution regions each with a pusher device.

2. The device as claimed in claim 1,
   wherein the pusher device is actuatable in such a manner that it changes at least temporarily from the first position to the second position or vice versa.

3. The device as claimed in claim 1,
   wherein the pusher device is actuatable in such a manner that it assumes the second position at least once the sprue point has supplied molding compound to the distribution region.

4. The device as claimed in claim 1,
wherein the pusher device is mechanically actuatable on the basis of a force generated according to the relative movement.

5. The device as claimed in claim 1,
wherein the pusher device comprises an actuating portion which is configured to interact, at least according to the relative movement, with an actuating region of the device, and wherein the interaction includes an at least temporary abutment and/or engagement between the actuating region and the actuating portion.

6. The device as claimed in claim 5,
wherein the interaction generates a movement of the actuating portion, wherein the movement takes place at an angle to the movement axis and substantially orthogonally to the movement axis.

7. The device as claimed in claim 5,
wherein the actuating region comprises a contoured control region which is configured to interact with the actuating portion,
and wherein the control region abuts the actuating portion at least temporarily.

8. The device as claimed in claim 1, wherein the pusher device is biased into one of the first position and the second position and, optionally, is movable into the respective other position according to the relative movement.

9. The device as claimed in claim 1,
wherein the object molding region is configured to mold the object that is to be produced along at least half of its length, and to mold it substantially along its entire length.

10. The device as claimed in claim 1,
wherein the feed region is formed in a substantially fixed portion along the movement axis.

11. The device as claimed in claim 1,
wherein the distribution regions are arranged one behind the other along the movement axis and are each actuatable according to the relative movement.

12. The device as claimed in claim 11,
which is configured to move into the first position at least one pusher device that is associated with a distribution region through which a molding compound is to be supplied directly, and wherein art least one further pusher device assumes or is moved into the second position.

13. The device as claimed in claim 1,
wherein the pusher device, in a region facing the object molding region, has a shape corresponding to an adjacent portion of the object molding region.

14. A method for producing objects from a solidifying molding compound by means of a device, wherein the device comprises a feed region having at least one sprue point for supplying the molding compound, and a mold insert which delimits at least in part a cavity in which the molding compound supplied via the sprue point can be received, wherein the cavity comprises at least one object molding region, which molds the object that is to be produced, wherein the object molding region is configured to produce a substantially elongate object, and at least one distribution region, which is adapted to guide supplied molding compound to the object molding region, and further comprises at least one pusher device which is configured, in a first position, to allow the object molding region and the distribution region to be connected and, in a second position, to separate the object molding region and the distribution region from one another, wherein the pusher device is biased into one of the first position and the second position and, optionally, is movable into the respective other position according to the relative movement, wherein the device comprises a plurality of distribution regions each with a pusher device,
comprising the steps:
moving the mold insert relative to the feed region along a movement axis, wherein the movement axis extends substantially parallel to a longitudinal axis of the object and
actuating the pusher device according to the relative movement.

* * * * *